United States Patent
Yanacek et al.

(10) Patent No.: US 8,756,100 B1
(45) Date of Patent: Jun. 17, 2014

(54) FACILITATING PURCHASE OF EXCESS ITEMS

(75) Inventors: David C. Yanacek, Seattle, WA (US); Gustavo Eduardo Lopez, Seattle, WA (US); Steven T. Rabuchin, Kirkland, WA (US); Michael M. George, Mercer Island, WA (US); Brandon H. Yarbrough, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 335 days.

(21) Appl. No.: 13/227,587

(22) Filed: Sep. 8, 2011

(51) Int. Cl.
*G06Q 30/00* (2012.01)
*G06Q 30/02* (2012.01)

(52) U.S. Cl.
CPC .................. *G06Q 30/0223* (2013.01)
USPC ........................................................ 705/14.24

(58) Field of Classification Search
CPC .................................................. G06Q 30/0223
USPC ........................................................ 705/14.24
See application file for complete search history.

(56) References Cited

U.S. PATENT DOCUMENTS

| | | | | |
|---|---|---|---|---|
| 8,463,628 | B1* | 6/2013 | Loeb et al. | 705/5 |
| 2008/0082355 | A1* | 4/2008 | Leach et al. | 705/1 |
| 2010/0066498 | A1* | 3/2010 | Fenton | 340/10.1 |
| 2010/0070313 | A1* | 3/2010 | Francis | 705/5 |
| 2010/0312649 | A1* | 12/2010 | Lurie | 705/14.66 |
| 2011/0054992 | A1* | 3/2011 | Liberty et al. | 705/14.24 |
| 2011/0071890 | A1* | 3/2011 | Hart et al. | 705/14.16 |
| 2011/0173059 | A1* | 7/2011 | Benson | 705/14.24 |
| 2012/0221396 | A1* | 8/2012 | Eglen et al. | 705/14.24 |
| 2012/0278154 | A1* | 11/2012 | Lange et al. | 705/14.24 |

* cited by examiner

*Primary Examiner* — James W Myhre
(74) *Attorney, Agent, or Firm* — Thomas | Horstemeyer, LLP

(57) ABSTRACT

Disclosed are various embodiments for facilitating the purchase of excess items. In one embodiment, customer information and inventory data are retrieved from a merchant client. A determination is made on whether excess items exist. A list of target purchasers is generated based on data associated with a user account, and offers are generated and sent by electronic communication to the list of target purchasers.

26 Claims, 7 Drawing Sheets

FACILITATING PURCHASE OF EXCESS ITEMS

BACKGROUND

Tickets for such events as concerts and sporting events may be sold through different channels such as online ticket merchants or by telephone order via a ticket sales representative. Many times, event tickets go unsold when venues and ticket merchants are unable to find demand for the available supply of tickets.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to facilitating the purchase of excess items by providing offers to purchase such items as tickets from excess inventory. Tickets for such events as concerts and sporting events may be sold through different channels such as online ticket merchants or by telephone order via a ticket sales representative. Many times, however, event tickets go unsold when venues and ticket merchants are unable to find demand for the available supply of tickets. While ticket merchants may offer the excess items (e.g., tickets) at a discounted price, this can affect future customer demand as initial customers who purchased the tickets at full price become aware of the discounted rates offered later.

In accordance with various embodiments, a determination is made relating to a list of purchasers who purchased an item at full price. An item may refer to tickets for attending an event (e.g., a sporting event) or products (e.g., books) that may be offered for sale, purchase, rental, lease, download, and/or any other form of consumption as may be appreciated. A list of prospective purchasers is generated based on activities of the purchasers. Such activities may correspond, for example, to past purchase history, search queries relating to network pages of merchants, subscriptions, etc. In one embodiment, an analytics engine facilitates deduplication of the list of prospective purchasers with respect to a list of initial purchasers. In particular, a target list of purchasers is derived based on the prospective purchasers where the target list of purchasers does not overlap with the list of purchasers who purchased the items at full price. The excess items are then offered to the target purchasers. In some embodiments, an electronic commerce system may facilitate purchase of the items offered to the target purchasers. In the following discussion, a general description of the system and its components is provided, followed by a discussion of the operation of the same.

Figure 1:
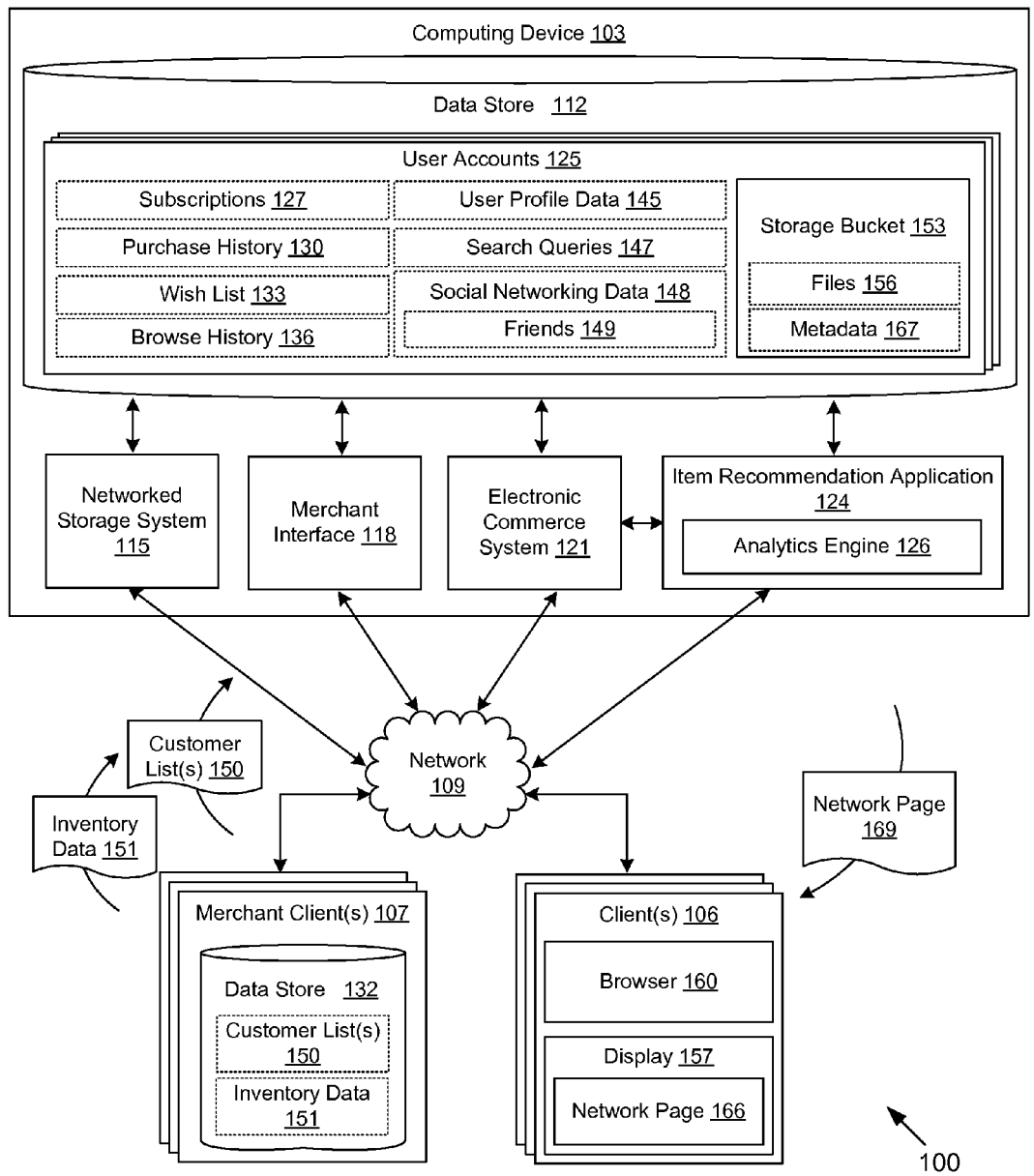
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores 112 as can be appreciated. The data stored in the data store 112, for example, is associated with the operation of the various applications and/or functional entities described below.

The components executed on the computing device 103, for example, include a networked storage system 115, a merchant interface 118, an electronic commerce system 121, an item recommendation application 124, and other applications, services, processes, systems, engines, or functionality not discussed in detail herein.

The networked storage system 115 is executed to maintain a file hierarchy of files and folders in networked or metadata-based file systems for users. The networked storage system 115 may be regarded as maintaining a file system for each of the users of the system. To this end, the networked storage system 115 may support various file-related operations such as, for example, creating files, deleting files, modifying files, setting permissions for files, downloading files, and/or other operations. The networked storage system 115 may be configured to maintain a record of file activity, e.g., uploading of files, downloading of files, deletion of files, preview of files, etc. The networked storage system 115 may be configured to serve up data addressed by uniform resource locator (URL) via hypertext transfer protocol (HTTP).

The merchant interface 118 is executed to facilitate electronic communications with one or more merchant clients 107 that provide tickets and other items to customers. The merchant interface 118 may receive, for example, customer lists 150 relating to initial customers who have already purchased tickets for an event at full price. The electronic commerce system 121 is executed to facilitate the online purchase of such items as tickets over the network 109. The electronic commerce system 121 also performs various backend functions associated with the online presence of a merchant in order to facilitate the online purchase of media items. For example, the electronic commerce system 121 may generate network pages or portions thereof that are provided to clients 106 for the purposes of selecting tickets and/or other items for purchase.

The item recommendation application 124 is executed to generate offer listings in the form of electronic communications with recommendations for the purchase of tickets and other items. Such recommendations may be generated based on the user's activities as well as other behavior of the friends or other individuals associated with a user as will be described. The item recommendation application 124 interfaces with the electronic commerce system 121 to provide network pages 169 or other electronic communication to one or more clients 106 to facilitate selection and purchase of tickets and other items.

The data stored in the data store 112 includes one or more user accounts 125. Associated with each user account 125, for example, is various data associated with a respective user such as subscriptions 127, purchase history 130, wish lists 133, browse history 136, user profile data 145, search queries 147, social networking data 148, among other types of data associated with a respective user. The social networking data 148 may include, for example, a listing of friends 149 of the user. Such friends 149 may comprise individuals with whom a user shares an interpersonal connection such as friendship, spousal relationships, being related by blood relationship, and other types of interpersonal connections.

The data associated with each user account 125 may also include a storage bucket 153 for storing files 156 and associated metadata 167. The subscriptions 127 associated with each user account 125 may correspond to magazines, newspapers, newsletters, etc. The purchase history 130 of a user may include a log or record of item purchases or consumption associated with a user through the electronic commerce system 121. The purchase history 130 may also include a log or record of past offerings provided by the item recommendation application 124 that have been redeemed by a user. The browse history 136 includes data relating to a history of browsing for items by a user through the electronic commerce system 121 and/or other systems, where such items may have been purchased by the user.

The user profile data 145 may include information about users with which the file systems in the networked storage system 115 are associated. The user profile data 145 may also include information about user accounts with the electronic commerce system 121. Such information may comprise, for example, name, shipping address, payment instruments, and other information. Account settings may be employed to specify and track various settings and other functionality with respect to a given account such as passwords, security credentials, file management permissions, storage quotas and limitations, authorized access applications, billing information, and/or other data. The user profile data 145 may also include profile or demographic data associated with users in addition to other profile information such as favorite team(s), music preference, favorite musician(s), and so on.

The social networking data 148 may indicate one or more social networks that are frequented by users associated with the user accounts 125. Non-limiting examples of social networks include Facebook®, Twitter®, MySpace®, and others. The friends 149 include those individuals who may or may not hold their own user account 125 with whom a given user has an interpersonal relationship. The friends 149 may be identified by interfacing with a given social network such as Facebook®, Twitter®, MySpace®, and others. For example, such social network sites may specify Applications Programming Interfaces (API's) to which the item recommendation application 124 may send an API call to request information about the friends of a user on such social networks. Alternatively, one or more user interfaces may be generated in the form of network pages or other content that facilitate a user specification of their friends 149 by facilitating a search for such individuals in the user accounts 125.

Assuming a listing of friends is obtained from a third party social networking site, the item recommendation application 124 may also employ various approaches to associating previously existing user accounts 125 with the friends 149 discovered for a given user. To this end, a user account 125 may be confirmed to belong to a friend 149 of a given user by sending further API calls to the social networking site to verify that the user account correlates to a friend 149 of the respective user on the social networking site. This may especially be necessary where a friend of an individual has a common name.

The analytics engine 126 in the item recommendation application 124 is executed to analyze the various data described above to identify prospective purchasers for excess tickets and other items. As a non-limiting example, the analytics engine 126 may analyze the purchase history 130 of a user in addition to search queries 147 performed relative to a network page of a merchant to identify an affinity between the user and events of interest. Based on this, the item recommendation application 124 provides an offer listing in the form of one or more network pages 169, email(s), or other electronic communication to the client 106, where the offer listing relates to excess tickets associated with the identified events of interest.

The analytics engine 126 is further configured to generate a list of target purchasers based on the list of prospective purchasers where the target purchasers do not include purchasers specified in the customer list 150 received from the merchant client 107. The item recommendation application 124 provides an offer listing with recommendations to the list of target purchasers, thereby providing the target purchasers an opportunity to purchase excess tickets or other items. The offer listings may be in the form of a text message, a quick response (QR) code, an advertisement, a network page, and so on.

When embedded in network pages, the offer listings provided to clients 106 may include such offer listing source data as hypertext markup language (HTML), extensible markup language (XML), extensible HTML (XHTML), mathematical markup language (MathML), scalable vector graphics (SVG), cascading style sheets (CSS), images, audio, video, graphics, text, and/or any other data that may be used in serving up or generating the offer listings. In some embodiments, the offer listing source data may be distributed across multiple data stores. The analytics engine 126 may further track statistics on how many recommended offers for excess tickets are purchased by target purchasers. Based on such statistics, the analytics engine 126 assigns weighting factors to the various data analyzed to derive prospective purchasers.

The client 106 is representative of a plurality of client devices that may be coupled to the network 109. The client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 106 may include a display 157. The display 157 may comprise, for example, one or more devices such as cathode ray tubes (CRTs), liquid crystal display (LCD) screens, gas plasma-based flat panel displays, LCD projectors, or other types of display devices, etc.

The client 106 may be configured to execute various applications such as a browser 160 and/or other applications. The browser 160 may be executed in a client 106, for example, to access and render network pages, such as web pages, or other network content served up by the computing device 103 and/or other servers, thereby rendering a network page 166 on the display 157. The network page 166 may comprise, for example, items relating to a recommendation provided by the item recommendation application 124 indicating that excess tickets are available to be purchased. The client 106 may be configured to execute applications beyond the browser 160 such as, for example, email applications, instant message applications, and/or other applications.

The merchant client 107 is representative of a plurality of client devices utilized by merchants, ticket distributors, stadium/venue operators, etc. that may be coupled to the network 109. The merchant client 107 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The merchant client 107 may include a data store 132 that includes customer lists 150 specifying customers who have already purchased tickets and other items. The customer lists 150 may include such information as account numbers, email addresses, and other identifiers associated with customers. The data store 132 may also include inventory data 151 for tracking the availability of excess tickets. The computing device 103 is in data communication with the merchant client 107 through the merchant interface 118. The analytics engine 126 in the item recommendation application 124 retrieves the customer list 150 and inventory data 151 from merchant clients 107.

According to various embodiments, the item recommendation application 124 is configured to generate recommendations for the purchase of excess items through the electronic commerce system 121. Various mechanisms may be employed by the item recommendation application 124 to generate a listing of target purchasers, where the target purchasers are provided an opportunity to purchase excess tickets.

Figure 2A:
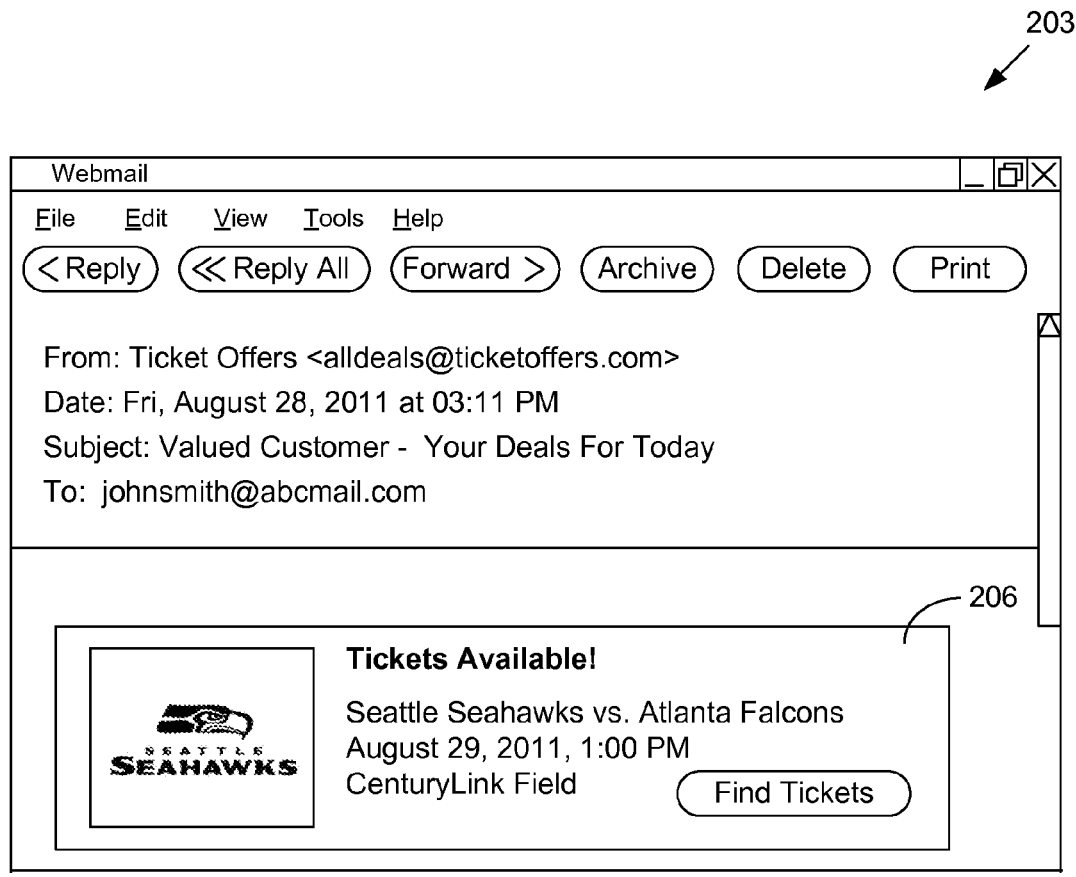
FIGS. 2A and 2B are example user interfaces depicting electronic communications with offers to target purchasers regarding excess tickets.

Shown in FIG. 2A is an example user interface depicting an electronic communication 203, such as an email, with an offer to a target purchaser regarding excess tickets. In one embodiment, the item recommendation application 124 (FIG. 1) provides an offer listing sent to a client 106 (FIG. 1). In this non-limiting example, the electronic communication 203 is an email communication transmitted from the item recommendation application 124 to a client 106 that includes information 206 relating to tickets for a sporting event. The information 206 includes such details as the teams that will be playing, the date, time, and location of the sporting event. The target purchaser is able to perform a search among the excess tickets still available.

In one embodiment, the item recommendation application 124 may also provide a price for the ticket(s) where price may be a discounted price relative to the price the tickets were originally on sale for. While the example in FIG. 2 depicts an email communication 203 transmitted by the item recommendation application 124, the offers to target purchasers may be transmitted in other forms of electronic communication including, for example, one or more network pages comprising web pages, which are rendered by a browser 160 (FIG. 1) in the client 106, text messages, QR codes and so on.

Figure 2B:
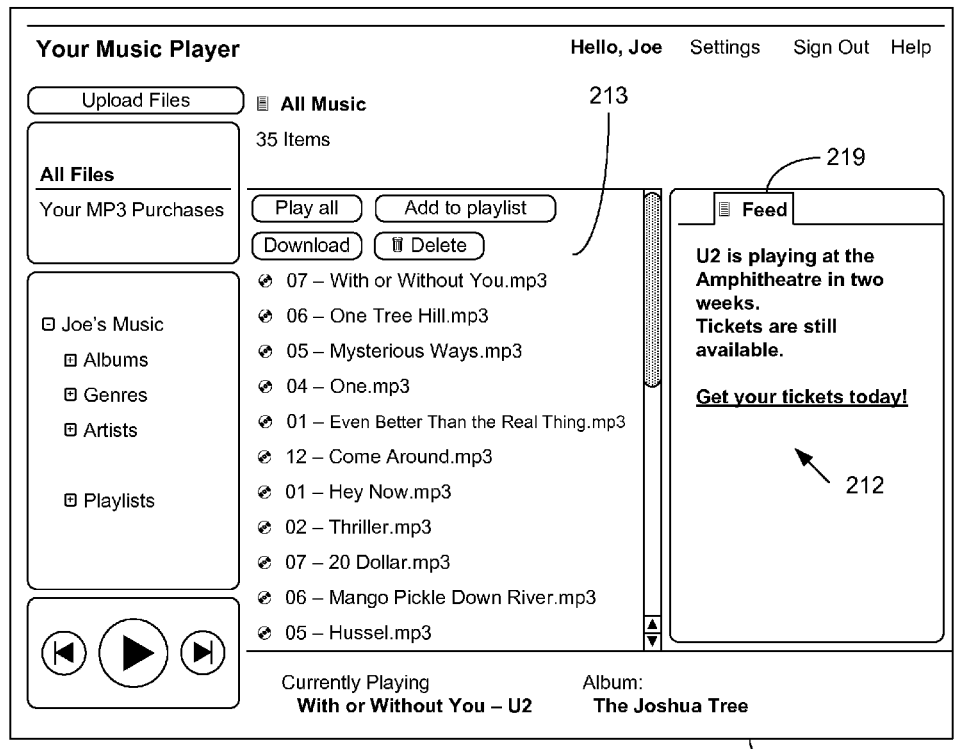

Referring next to FIG. 2B, shown is an example of a user interface depicting an electronic communication 210 with an offer to a target purchaser regarding excess tickets. The user interface 210 may be rendered by the browser 160 (FIG. 1), a media player, a mobile application, or another application. The user interface 210 includes a listing 213 of media files, which may comprise files 156 (FIG. 1) stored in the data store 112 (FIG. 1).

A feed panel 219 may be rendered alongside the listing 213 or in another location in conjunction with the listing 213. The feed panel 219 is utilized for conveying offers 212 to target purchasers who may be interested in purchasing tickets that are available. In the non-limiting example of FIG. 2B, the analytics engine 126 (FIG. 1) determines that the user may be interested in attending an upcoming concert corresponding to a particular artist based on the user's music collection stored in the storage bucket 153 (FIG. 1). The item recommendation application 124 (FIG. 1) generates the offer 212 shown in the feed panel 219 that notifies the user that tickets are available. A link may be provided for the target user to order tickets for the upcoming concert event.

Figure 3:
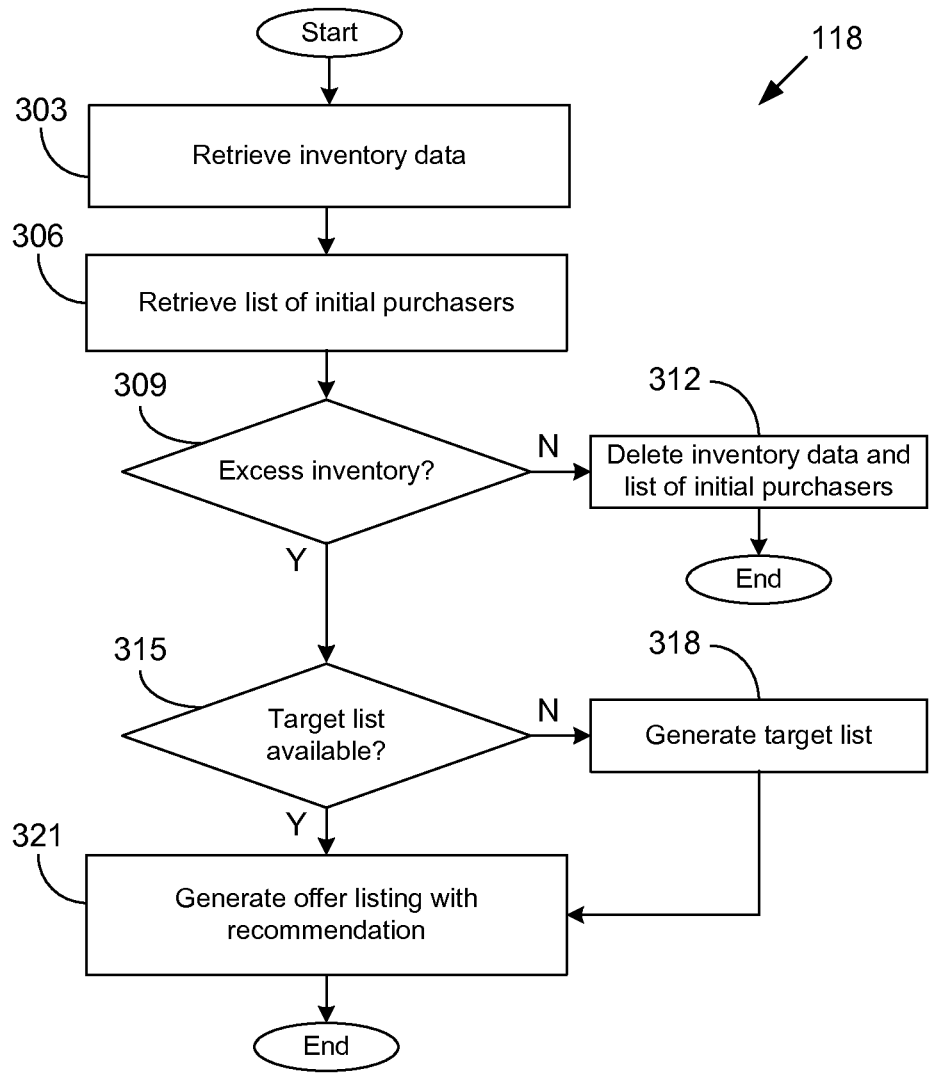
FIG. 3 is a flowchart that provides one example of the operation of a portion of the merchant interface in FIG. 1 according to various embodiments.

Referring next to FIG. 3, shown is a flowchart that provides one example of the operation of a portion of the merchant interface 118 according to various embodiments. It is understood that the flowchart of FIG. 3 provides merely an example of the many different types of functional arrangements that may be employed to implement the operation of the portion of the merchant interface 118 as described herein. As an alternative, the flowchart of FIG. 3 may be viewed as depicting an example of steps of a method implemented in the computing device 103 (FIG. 1) according to one or more embodiments. The merchant interface 118 is executed in the computing device 103 and interfaces with the merchant client 107 (FIG. 1) over the network 109 (FIG. 1).

Beginning with box 303, the merchant interface 118 retrieves inventory data 151 (FIG. 1) from the merchant client 107. The inventory data 151 may specify, for example, the total number of tickets for a particular event in addition to the number of excess tickets, if any, that are unsold. The inventory data 151 may also comprise ticket information relating to what seats have been sold and what seats are still available. In box 306, the merchant interface 118 retrieves a customer list 150 (FIG. 1) comprising a list of initial purchasers who purchased tickets at full price. In box 309, if no excess tickets are available, the merchant interface 118 proceeds to box 312 and deletes the inventory data 151 and customer list 150 retrieved from the merchant client 107. If excess tickets are available, then the merchant interface 118 proceeds to box 315 and determines if a list of target purchasers are available at the merchant client 107. Such target purchasers may represent, for example, prime or select customers who purchase tickets on a regular basis from the merchant.

If a list of target purchasers is not available then the merchant interface 118 proceeds to box 318 and a list of target purchasers is generated, as described below. If a list of target purchasers is available from the merchant, the merchant interface 118 proceeds to box 321, where offer listings are generated for the list of target purchasers to provide the target purchasers an opportunity to purchase the excess tickets. Thereafter the merchant interface 118 ends as shown.

Figure 4:
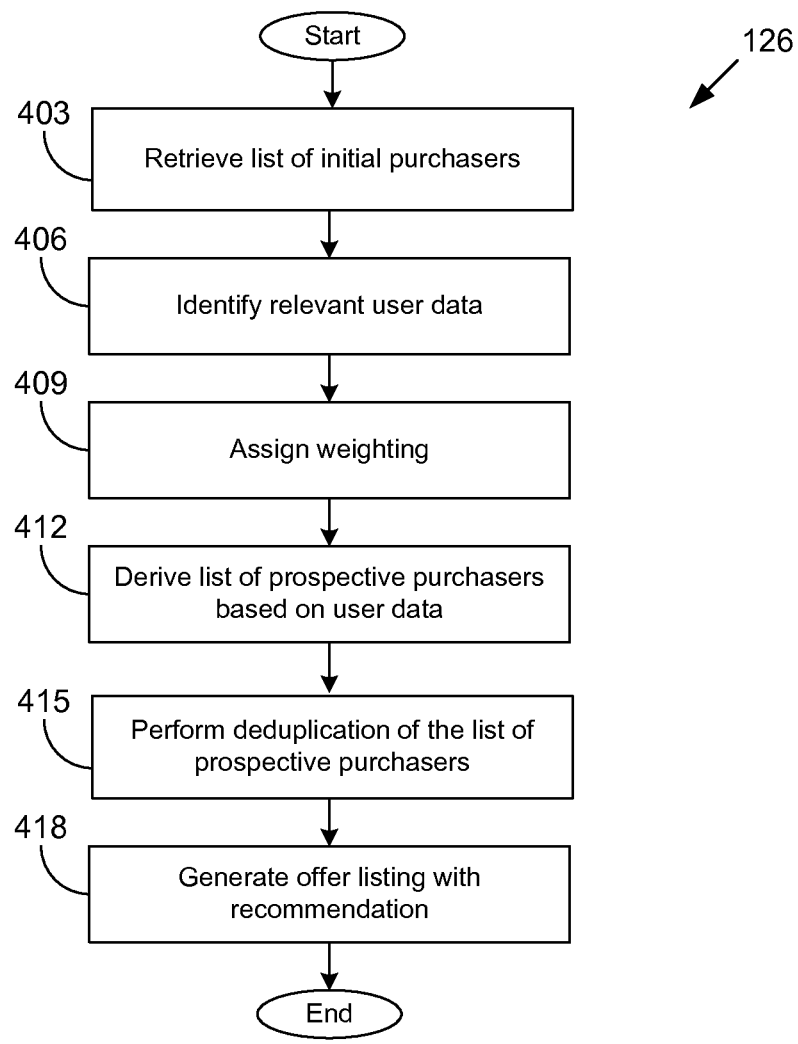
FIG. 4 is a flowchart that provides one example of the operation of a portion of the analytics engine in FIG. 1 according to various embodiments.

Referring next to FIG. 4, shown is a flowchart that provides one example of the operation of a portion of the analytics engine 126 according to various embodiments. It is understood that the flowchart of FIG. 4 provides merely an example of the many different types of functional arrangements that may be employed to implement the operation of the portion of the analytics engine 126 as described herein. As an alternative, the flowchart of FIG. 4 may be viewed as depicting an example of steps of a method implemented in the computing device 103 (FIG. 1) according to one or more embodiments.

Beginning with box 403, the analytics engine 126 retrieves a list of initial purchasers. As described above, the merchant interface 118 (FIG. 1) may interface with merchant clients 107 (FIG. 1) to retrieve a customer list 150 (FIG. 1) with the initial purchasers. The analytics engine 126 may then obtain the customer list 150 from the merchant interface.

In box 406, the analytics engine 126 identifies relevant user data to be used in deriving a list of prospective purchasers. As described earlier, the data stored in the data store 112 (FIG. 1) includes one or more user accounts 125 (FIG. 1). Associated with each user account 125 (FIG. 1), for example, is various data associated with a respective user such as subscriptions 127 (FIG. 1), purchase history 130 (FIG. 1), wish lists 133 (FIG. 1), browse history 136 (FIG. 1), user profile data 145 (FIG. 1), search queries 147 (FIG. 1), social networking data 148 (FIG. 1), among other types of data associated with a respective user. The data associated with each user account 125 may also include a storage bucket 153 (FIG. 1) for storing files 156 (FIG. 1) and associated metadata 167 (FIG. 1).

All or a subset of the data above may be relevant in deriving a list of prospective purchasers. As a non-limiting example, the analytics engine 126 may have retrieved a list of initial purchasers who purchased tickets to a Seattle Seahawks® game to be played in two days. Based on the nature of the event (i.e., a football game), the analytics engine 126 may determine that such data as subscriptions 127 (for example, to sports news publications), search queries 147, and purchase history 130 (relating to, for example, sports team merchandise) are highly relevant in deriving a list of prospective purchasers. Other pieces of information such as the geographical location of the user specified in the user profile data 145 may also be relevant.

In box 409, the analytics engine 126 assigns weighting factors to the relevant data. As a non-limiting example, the analytics engine 126 may assign a relatively high weighting factor to purchase history 130 as the purchase history 130 may reflect past purchases of tickets for other sporting events. The analytics engine 126 may also assign a relatively high weighting factor because previously applying the purchase history 130 as a criteria resulted in a target purchaser purchasing a ticket. In this regard, the analytics engine 126 may be configured to evaluate trends relating to successful strategies and store such information for future use in applying criteria. In box 412, the analytics engine 126 derives a list of prospective purchasers based on the weighted user data.

In box 415, the analytics engine 126 performs deduplication of the list of prospective purchasers with respect to the list of initial purchasers. In box 418, offer listings relating to the excess supply of tickets are generated. Thereafter the analytics engine 126 ends as shown.

Figure 5:
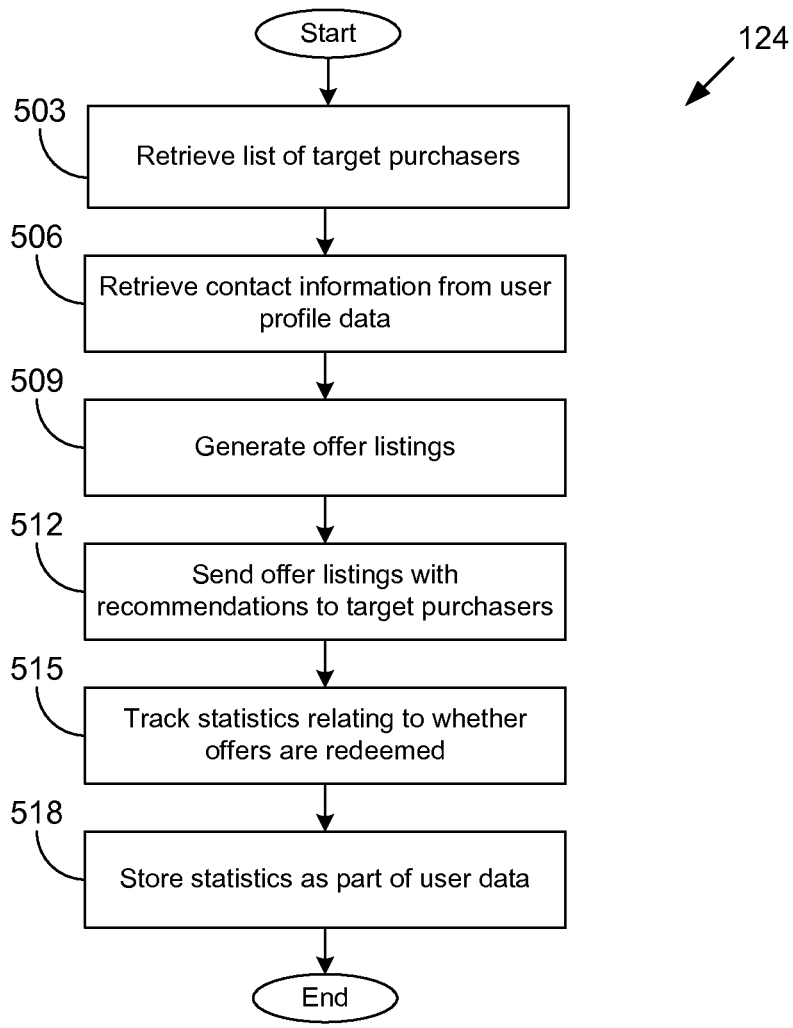
FIG. 5 is a flowchart that provides one example of the operation of a portion of the item recommendation application in FIG. 1 according to various embodiments.

Referring next to FIG. 5, shown is a flowchart that provides one example of the operation of a portion of the item recommendation application 124 according to various embodiments. It is understood that the flowchart of FIG. 5 provides merely an example of the many different types of functional arrangements that may be employed to implement the operation of the portion of the item recommendation application 124 as described herein. As an alternative, the flowchart of FIG. 5 may be viewed as depicting an example of steps of a method implemented in the computing device 103 (FIG. 1) according to one or more embodiments.

Beginning in box 503, the item recommendation application 124 retrieves the list of target purchasers derived by the analytics engine 126 (FIG. 1). In box 506, the item recommendation application 124 retrieves contact information for each of the target purchasers from the data store 112 (FIG. 1). Such contact information as email addresses may be stored as part of the user profile data 145 (FIG. 1).

In box 509, offer listings are generated by the item recommendation application 124 and sent to clients 106 (FIG. 1) by email or other means of electronic communications. Other means of communicating with target purchasers may be found, for example, in the user profile data 145 (FIG. 1) or social networking data 148 (FIG. 1). In box 512, the generated offer listings with recommendations for purchasing excess items are sent to the target purchasers. Various social network sites may specify Applications Programming Interfaces (API's) to which the item recommendation application 124 may send an API call to transmit information relating to offers to purchase excess tickets.

The item recommendation application 124 may also generate an advertisement, for example, that is displayed when a user accesses their social networking profile or other third party site. As another means of electronic communication, the item recommendation application 124 may also send a link via email to the client 106 where the link corresponds to a network page 169 (FIG. 1) rendered on the display 157 (FIG. 1) at the client 106.

In box 515, the item recommendation application 124 may be further configured to track statistics relating to whether offers are redeemed. As a non-limiting example, the item recommendation application 124 may log or record that a particular target purchaser redeemed an offer to purchase tickets for a concert event relating to a particular musician as such data may become useful in generating future offer listings. The item recommendation application 124 may also be configured to track statistics regarding target purchasers who unsubscribe to receiving offers. In box 518, the item recommendation application 124 may store the statistics as part of the user data stored in the data store 112 in the computing device 103. Thereafter, the item recommendation application 124 ends as shown.

Figure 6:
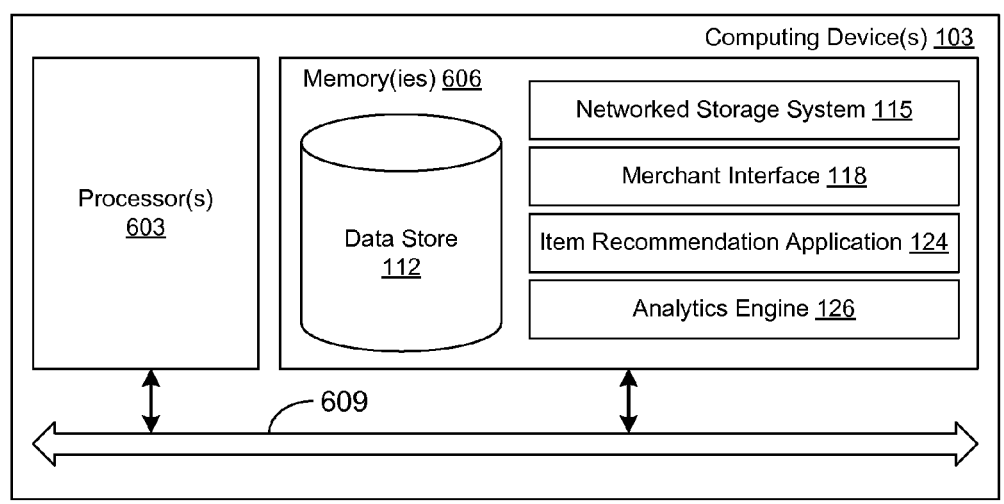
FIG. 6 is a schematic block diagram that provides one example illustration of a computing device employed in the networked environment of FIG. 1 according to various embodiments of the present disclosure.

With reference to FIG. 6, shown is a schematic block diagram of the computing device 103 according to an embodiment of the present disclosure. The computing device 103 includes at least one processor circuit, for example, having a processor 603 and a memory 606, both of which are coupled to a local interface 609. To this end, the computing device 103 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the networked storage system 115, the merchant interface 118, the item recommendation application 124, the analytics engine 126, and potentially other applications. Also stored in the memory 606 may be a data store 112 and other data. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the networked storage system 115, the merchant interface 118, the item recommendation application 124, the analytics engine 126, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3-5 show examples of functionality of an implementation of portions of the merchant interface 118, analytics engine 126, and the item recommendation application 124. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts of FIGS. 3-5 show a specific order of execution, it is understood that the order of execution may differ from that which is depicted. For example, the order of execution of two or more blocks may be scrambled relative to the order shown. Also, two or more blocks shown in succession in FIGS. 3-5 may be executed concurrently or with partial concurrence. Further, in some embodiments, one or more of the blocks shown in FIGS. 3-5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the networked storage system 115, the merchant interface 118, the item recommendation application 124, the analytics engine 126, that comprises software or code can be embodied in any non-transitory computer-readable medium for use by or in connection with an instruction execution system such as, for example, a processor in a computer system or other system. In this sense, each may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying at least one program executable in a computing device, the at least one program comprising:
   code that determines an availability and at least one first ticket price associated with a plurality of tickets for attending an event;
   code that retrieves a listing of purchasers of at least one of the plurality of tickets for the event from a ticket merchant, the at least one of the plurality of tickets being purchased at the at least one first ticket price from the ticket merchant;
   code that obtains a listing of contacts associated with the listing of purchasers, the listing of contacts obtained from a third party social networking site;
   code that determines a listing of target ticket purchasers based at least in part upon the listing of contacts, the listing of target ticket purchasers being mutually exclusive of the listing of purchasers; and
   code that generates an electronic communication embodying an offer listing to the target ticker purchasers for purchasing from an excess supply of the plurality of tickets through an electronic commerce system, the offer listing referencing the excess supply of the plurality of tickets and at least one second ticket price, the at least one second ticket price being a portion of the at least one first ticket price.

2. The non-transitory computer-readable medium of claim 1, further comprising code that determines a listing of prospective ticket purchasers, wherein code that determines the listing of target ticket purchasers is configured to remove duplicates between the listing of prospective ticket purchasers and the listing of purchasers to determine the listing of target ticket purchasers.

3. The non-transitory computer-readable medium of claim 2, wherein code that determines the listing of prospective ticket purchasers is further configured to apply at least one criteria in determining the listing of target ticket purchasers.

4. The non-transitory computer-readable medium of claim 3, wherein the at least one criteria is weighted.

5. A method, comprising:
   determining, by at least one computing device, an availability and at least one first item price associated with a plurality of items;
   determining, by the at least one computing device, a listing of initial purchasers of at least one of the plurality of items, the at least one of the plurality of items being purchased by the listing of initial purchasers at the at least one first item price;
   obtaining, by the at least one computing device, a listing of contacts associated with the listing of initial purchasers, the listing of contacts obtained from a third party social networking site;
   determining, by the at least one computing device, a listing of target purchasers based at least in part upon the listing of contacts, the listing of target purchasers being mutually exclusive of the listing of initial purchasers;
   generating, by the at least one computing device, an offer listing for purchasing from an excess of the plurality of items at at least one second item price; and
   providing the offer listing to the listing of target purchasers.

6. The method of claim 5, wherein determining the listing of target purchasers comprises:
   determining, by the at least one computing device, a listing of prospective item purchasers; and
   removing, by the at least one computing device, duplicates between the listing of prospective item purchasers and the listing of initial purchasers to determine the listing of target purchasers.

7. The method of claim 6, wherein determining the listing of prospective item purchasers further comprises:
   retrieving, by the at least one computing device, a set of criteria; and
   determining, by the at least one computing device, prospective purchasers of the excess of the plurality of items based at least in part on the set of criteria.

8. The method of claim 7, wherein the set of criteria is weighted according to at least one purchase by the prospective purchasers of past offer listings.

9. The method of claim 7, wherein the set of criteria comprises at least one of: past purchase history, search queries, subscriptions, multimedia playlists, wish lists, product views, and data stored on the at least one computing device.

10. The method of claim 5, wherein determining, by the at least one computing device, the availability and the at least one first item price associated with the plurality of items further comprises retrieving information from an item distributor relating to the availability and the at least one first item price.

11. The method of claim 5, wherein the plurality of items comprise a plurality of tickets for an event.

12. The method of claim 5, wherein the at least one second item price is a portion of the at least one first item price.

13. The method of claim 5, wherein providing the offer listing to the purchasers comprises providing the offer listing in electronic mail format to the purchasers.

14. The method of claim 5, wherein providing the offer listing to the purchasers comprises providing the offer listing as an advertisement on a third party network page.

15. A system, comprising:
   at least one computing device; and
   an item recommendation application executable in the at least one computing device, the item recommendation application comprising:
      logic that retrieves a listing of at least one purchaser of an item, the at least one purchaser having purchased the item at at least one first price;
      logic that obtains a listing of contacts associated with the listing of at least one purchaser, the listing of contacts obtained from a third party social networking site;
      logic that determines at least one target purchaser for purchasing from an excel inventory of the item based at least in part upon the listing of contacts;
      logic that determines at least one different price for purchasing from the excess inventory of the item; and
      logic that provides an offer listing to the at least one target purchaser, the offer listing providing a recommendation referencing the excess inventory of the item, the offer listing further referencing the at least one different price.

16. The system of claim 15, wherein logic that determines the at least one different price for purchasing the excess inventory of the item is configured to determine the at least one different price according to demand for the excess inventory of the item.

17. The system of claim 15, wherein logic that determines the at least one target purchaser for purchasing from the excess inventory of the item is configured to determine the at least one target purchaser according to at least one of: account information, data associated with at least one social networking service, product interest, search queries relative to a network page of a merchant, team interest, or purchase of previous offer listings.

18. The system of claim 15, wherein logic that determines the at least one target purchaser for purchasing from the excess inventory of the item is configured to determine the at least one target purchaser according to geographical location of prospective purchasers.

19. The system of claim 15, wherein the at least one target purchaser is mutually exclusive of the at least one purchaser having purchased the item at the at least one first price.

20. The system of claim 15, wherein item comprises a ticket associated with an event.

21. The system of claim 20, wherein the event comprises one of: a sporting event, a concert event, a theatre event, and an art event.

22. The system of claim 20, wherein logic that retrieves the listing of the at least one purchaser of the item is configured to retrieve the listing from at least one of: a ticket distributor or a venue hosting the event associated with the ticket.

23. The system of claim 15, wherein logic that provides the offer listing to the at least one target purchaser is configured to provide the offer listing through at least one of: a network page, an electronic mail message, a text message, a quick response (QR) code, and an advertisement.

24. The system of claim 23, wherein the advertisement is embodied in a third party network page rendered on a client device associated with the at least one target purchaser.

25. A method, comprising:
   determining, by at least one computing device, a listing of prospective purchasers of an excess item based at least in part on social networking data corresponding to a listing of contacts for at least one purchaser of the item, wherein the listing of contacts is obtained from a third party social networking site;
   determining, by the at least one computing device, a listing of target purchasers from the listing or prospective purchasers based at least in part on application of at least one criteria associated with the listing of prospective purchasers;
   generating, by the at least one computing device, an offer listing for purchasing from the excess of the item; and
   providing the offer listing to the listing of target purchasers.

26. The method of claim 25, wherein the at least one criteria is weighted based at least in part on purchases made in response to prior offer listings provided to the listing of target purchasers.

* * * * *

UNITED STATES PATENT AND TRADEMARK OFFICE
CERTIFICATE OF CORRECTION

| | | |
|---|---|---|
| PATENT NO. | : 8,756,100 B1 | Page 1 of 1 |
| APPLICATION NO. | : 13/227587 | |
| DATED | : June 17, 2014 | |
| INVENTOR(S) | : David C. Yanacek et al. | |

It is certified that error appears in the above-identified patent and that said Letters Patent is hereby corrected as shown below:

In the Claims

Column 11, line 33, claim 1: replace "ticker" with -- ticket --

Column 12, line 57, claim 15: replace "excel" with -- excess --

Column 13, line 15, claim 18: replace "to geographical" with -- to a geographical --

Column 13, line 20, claim 20: replace "wherein item" with -- wherein the item --

Signed and Sealed this
Thirty-first Day of March, 2015

Michelle K. Lee
*Director of the United States Patent and Trademark Office*